(12) United States Patent
Kan et al.

(10) Patent No.: US 6,463,456 B1
(45) Date of Patent: Oct. 8, 2002

(54) EFFICIENT REGISTRATION FOR DISTRIBUTED TRANSACTION SYSTEMS

(75) Inventors: Teresa C. Kan, Rochester, MN (US); Michael D. McKeehan, Green Bay, WI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,101

(22) Filed: Sep. 1, 1999

(51) Int. Cl.$^7$ .............................................. G06F 15/16
(52) U.S. Cl. ....................................... 709/201; 709/217
(58) Field of Search ................................. 709/201, 217, 709/101, 104; 707/104

(56) References Cited

U.S. PATENT DOCUMENTS

| | | | | |
|---|---|---|---|---|
| 5,768,587 A | * | 6/1998 | Freund et al. | 709/101 |
| 6,009,405 A | * | 12/1999 | Leymann et al. | 705/1 |
| 6,016,495 A | * | 1/2000 | McKeehan et al. | 707/102 |
| 6,105,147 A | * | 8/2000 | Molloy | 714/16 |
| 6,374,243 B1 | * | 4/2002 | Kobayashi et al. | 707/10 |

* cited by examiner

*Primary Examiner*—Mehmet B. Geckil
(74) *Attorney, Agent, or Firm*—Schmeiser, Olsen & Watts, LLP (57) ABSTRACT

The preferred embodiment provides an improved system and method for registration of Resource Managers with Transaction Managers in an distributed processing environment. The preferred system and method creates and stores a transactional resource in a container when the first execution method goes to the Resource Manager. The transactional resource represents the Resource Manager to the Transaction Manager. The transactional resource uses X/Open static registration procedures to inform the Resource Manager about the new transaction. The transactional resource is then registered to the Transaction Manager. In this way, only those Resources Managers that are involved in a transaction are registered and made known to registered to the Transaction Manager. Additionally, because static registration procedures are used, the Transaction Manager maintains control of the transaction

50 Claims, 6 Drawing Sheets

EFFICIENT REGISTRATION FOR DISTRIBUTED TRANSACTION SYSTEMS

BACKGROUND OF THE INVENTION

1. Technical Field

The present invention relates in general to the distributed computing. More specifically, the present invention relates to the field of registration in distributed transaction processing computing.

2. Background Art

The development of the EDVAC computer system of 1948 is often cited as the beginning of the computer era. Since that time computers have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Computer networks are capable of performing jobs that no single computer could perform and they allow low cost personal computer systems to connect to larger systems to perform tasks that such low cost systems could not perform alone. In order for computer systems to cooperate in a network to perform some complex job, software must be developed which efficiently delegates parts of the chore or tasks to different computers in the network.

The International Standards Organization (ISO) has defined an ISO Distributed Transaction Processing (DTP) standard to support the synchronization and co-ordination of distributed applications to ensure that transactions can be reliably completed on multiple open systems. X/Open is an industrial standards organization that has defined a reference module for the OSI DTP. X/Open has also defined application program interfaces and system interfaces between system components defined in the model.

The X/Open model defines the various system elements that work together to perform distributed transaction processing. In particular, the X/Open model defines Transaction Managers (TMs) and Resource Managers (RMs) that work together, along with other elements, to facilitate distributed processing. Transaction Managers are the components that assign identifiers to transactions, monitor the progress of transactions, and take responsibility for transaction completion and coordinating failure recovery. Resource Managers are the components that provide access to resources, such as database systems. Typically, the Transaction Manger coordinates the start and completion of the global transactions of each participating Resource Manager. For example, when an application calls the Transaction Manager to start a global transaction, the Transaction Manager assigns a global transaction ID and informs the Resource Manager about the new transaction branch. After the application performs operations on the Resource Manager within the global transaction, the Transaction Manager calls the Resource Manager to either commit or rollback the transaction branch. Also, if failure recovery is needed the Transaction Manager recalls the failed transaction from the Resource Manager and continues to complete the failed transaction.

In order for Transaction Managers and Resource Managers to work together to facilitate distributed processing, the X/Open model requires that all Resource Managers register to the Transaction Manager before the distributed transaction is begun. This registration makes the Resource Manager known to the Transaction Manager, such that they can work together to complete transactions.

Currently, some systems use a registration system typically referred to as "static registration." In static registration, all Resource Managers are required to the Transaction Manager before any distributed transaction occurs. In particular, because there is no efficient way for a Transaction Manager to dynamically know what Resource Managers are going to be involved in a particular distributed transaction, current static registration methods require that all Resource Managers register with the Transaction Manager when the Transaction Manager is constructed. This static registration is required even if a particular Resource Manager will not participate in an upcoming distributed transaction.

When a distributed transaction is then started, the Transaction Manager must inform all registered Resource Managers to start a transaction even though some of those Resource Managers will not be involved in the current transaction.

The requirement that all Resource Managers register beforehand with the Transaction Managers and that all Resource Managers, even those not participating in a transaction, be notified when a transaction starts results in transactional complexity that causes delay and other significant inefficiencies. In particular, if all the Resource Managers must register to the Transaction Manager even though some of those Resource Managers are not involved in the current transaction, then each transaction causes unnecessary flows. For example, if there are two Resource Managers involved in the current transaction and there are four Resource Managers registered to the Transaction Manager, then there will be six extra flows per transaction (i.e., two extra xa_start, two extra xa_end, and two extra xa_prepare). Additionally, these extra flows may involve distributed processes that can cause even more overhead.

For this reason there has recently been other attempts to utilize "dynamic registration" of the Resource Managers. Unfortunately, some of these techniques have also had significant drawbacks. One significant drawback is the loss of execution control by the Transaction Manager. In particular, the Transaction Manager does not have control over the starting of transactions as it does when static registration is used. Instead, the Transaction Manager waits for the Resource Manager to inform the Transaction Manager that it is involved in a new transaction. In a normal case, this can be an efficient way to let the Resource Manager participate in a transaction. However, in some cases a new transaction will be instantiated by the Resource Manager in the process of ending a global transaction and an unpredictable error will occur.

There thus remains no effective way to register Resource Managers with Transaction Managers in an X/Open distributed transaction system Thus, what is a needed is a mechanism providing an efficient way to use register and control the transaction involvement of Resource Managers without requiring unnecessary Resource Manager involvement.

DISCLOSURE OF THE INVENTION

The preferred embodiment provides an improved system and method for registration of Resource Managers with Transaction Managers in an X/Open distributed processing environment. The preferred system and method creates and stores a transactional resource in a container when the first execution method goes to the Resource Manager. The transactional resource represents the Resource Manager to the Transaction Manager. The transactional resource uses X/Open static registration procedures to inform the Resource Manager about the new transaction. The transactional resource is then registered to the Transaction Manager. In this way, only those Resources Managers that are involved in a transaction are registered and made known to registered to the Transaction Manager. Additionally, because static registration procedures are used, the Transaction Manager maintains control of the transaction.

Additionally, in the preferred embodiment the transactional resource implements the commit control interfaces on behalf of the Resource Manager. Thus, when an application decides to a commit (or rollback) a transaction, the commit (or rollback) command will call the transactional resource and the transactional resource will call the Resource Managers for this transaction with the appropriate command.

In the preferred embodiment, the transactional resource is created in and by a container that additionally stores information which relates to corresponding Resource Managers. When a transaction is started that operates on a business object in the container, the container will create a transactional resource that will represent the Resource Manager to the Transaction Manager for this transaction. The container will then register the new transactional resource to the Transaction Manager. The Transaction Manager then informs the Resource Manager about starting a new transaction indirectly via the transactional resource using the static registration technique.

This registration process will need to occur once for each transaction, only on the first execution of a method on the business object which resides in the container for this Resource Manager. Furthermore, because only those transactional resources that represent Resource Managers involved in the transaction are registered with the Transaction Manager, only those Resource Managers participating in the transaction will be involved by the Transaction Manager. Stated another way, the Transaction Manager selectively learns which resources are involved in a current transaction, and thus only has to interact with those resources actually involved in the current transaction.

Thus, the preferred embodiment provides that a registration method and mechanism that minimizes unnecessary flows by limiting calls to only those resources that are involved in transactions while allowing the Transaction Manager to retain control of the transaction. In particular, the preferred embodiment allows the use of X/Open static registration techniques to facilitate a selective registration that does not suffer from the limitations of previous X/Open dynamic registration methods.

The foregoing and other features and advantages of the present invention will be apparent from the following more particular description of the preferred embodiment of the invention, as illustrated in the accompanying drawings.

BEST MODE FOR CARRYING OUT THE INVENTION

As discussed in the Summary section, the present invention was developed for use in the International Standards Organization (ISO) Distributed Transaction Processing (DTP), and in particular in the X/Open defined reference model for the OSI DTP. Additionally, this invention uses object-oriented programming techniques. Individuals skilled in the art of object-oriented programming, distributed transaction processing and X/Open technology may wish to proceed to the Detailed Description section of this specification. However, those individuals who are new to X/Open technology, or new to distributed processing in general, should read this overview section in order to best understand the benefits and advantages of the present invention.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs.

A pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and JAVA are all examples of languages that support object-oriented programming to one degree or another.

X/Open Distributed Transaction Processing

Figure 6:
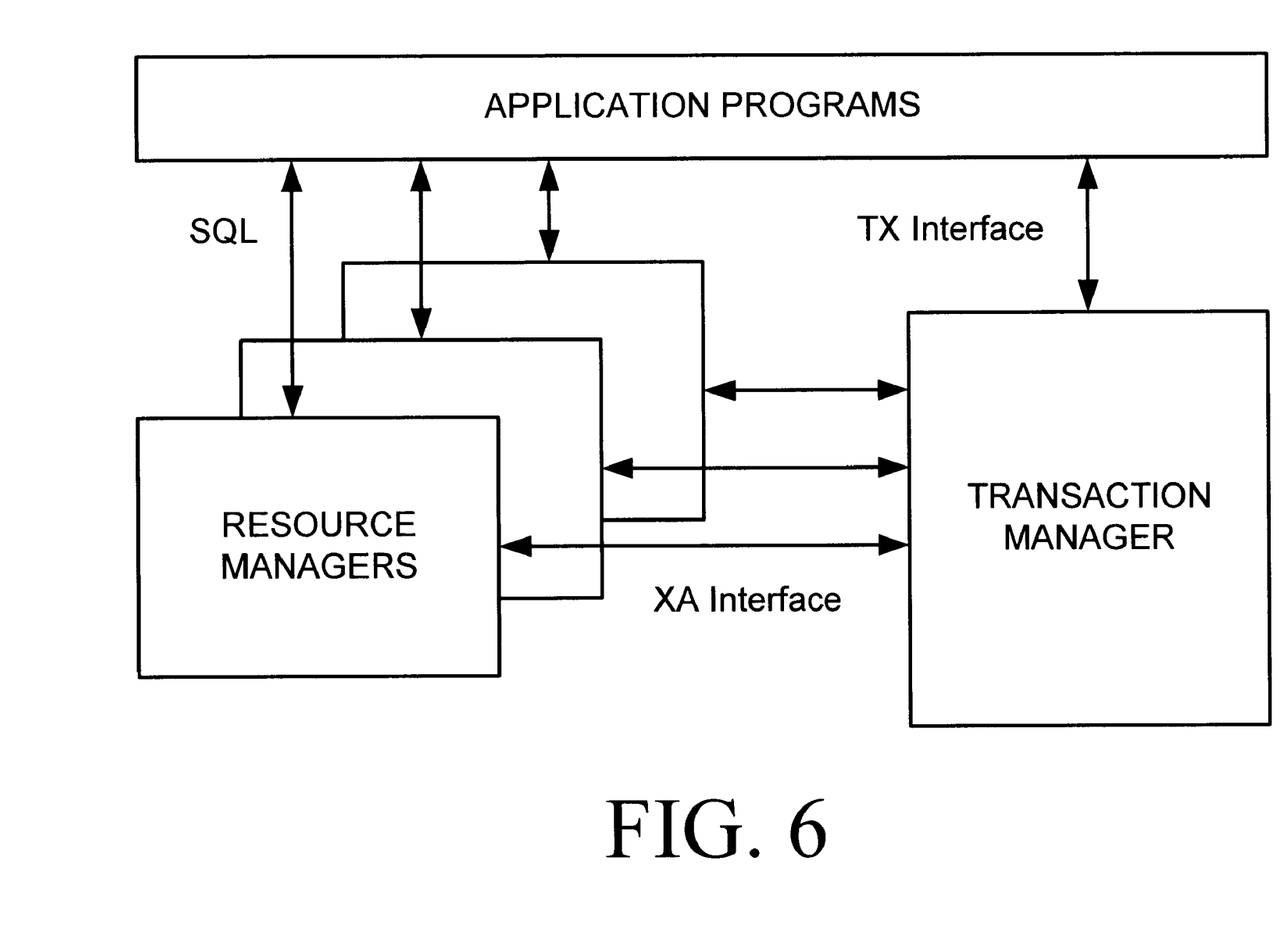
FIG. 6 is a schematic block diagram of an X/Open system.

There are three main components in the X/Open Distributed Transaction Processing model, application programs, resource managers, and transaction managers. In X/Open systems, these three elements work together to assure consistent execution of transactions in distributed processing systems. Turning to FIG. 6, an Application program, Transaction Manager and Resource Managers are illustrated schematically as they would interact in an X/Open system. FIG. 6 also illustrates the interfaces between these elements. In an X/Open system, the application program specifies and orders the actions which constitute the transactions. The Resource Managers provide access to shared resources such as databases. The Transaction Managers assign identifiers to transactions, monitors their programs, and takes responsibility for transaction completion and for failure recovery. Some elements from an X/Open system that are not directly involved in the present invention are not illustrated, such as communication managers.

The X/Open model defines the interfaces between the application programs, Transaction Managers, and Resource Managers. Application programs communicate with the Transaction Manager to delimit transactions. The Transaction Manager provides the application with API calls to inform it of the start, end and disposition of transactions. The application program communicates with the Resource Manager directly to perform useful work. For example, the Resource Manager may provide an embedded structured query language (SQL) interface for interacting with the application.

In X\Open systems, the Transaction Manager and Resource Manager communicate using what is referred to as the XA interface. The XA interface follows a designed specification which describes the protocol for transaction coordination, commitment and recovery. The XA interface also implements a two phase commit protocol, which is described in greater detail below.

A transaction, as defined in the well-respected work, *Transaction Processing. Concepts and Techniques,* by Jim Gray and Andreas Reuter, ISBN 1-55860-190-2, is a collection of operations on the physical and abstract application state. Transactions may include reading or modifying data resources involved in the transaction. In that regard, a distributed transaction refers to a transaction involving data resources throughout a distributed environment.

In X/Open terminology, "global transactions" are transactions that involve Resource Managers that are known to the Transaction Manager and are under the Transaction Managers two phase commit control. A global transaction is thus a unit of work that could involve one or more Resource Managers. A transaction branch is part of the work between a Transaction Manager and a Resource Manager to support the global transaction. A global transaction could have multiple transaction branches when multiple Resource Managers are accessed through one or more application processes that are coordinated by the Transaction Manager. Global transactions are coordinated by the Transaction Manager, with each application process having its own transaction branch with a Resource Manager. The Transaction Manager assigns transaction identifiers (known as XIDs) to identify the global transaction and the specific transaction within an Resource Manager.

A transaction begins when the application program initiates a requested transaction. This is done by the application program issuing a Begin_Transaction( ) request to the Transaction Manager. The transaction ends with either a commit or rollback operation coordinated by the Transaction Manager. A commit operation successfully completes the transaction, while a rollback operation terminates the transaction without completion and returns the resources to the pre-transaction state due to abnormal circumstances.

The commit and rollback operations are employed to ensure that the transaction has atomic, consistent, isolated, and durable (ACID) properties. Atomicity means that changes to the state of resources will either all occur or none of them will occur. Accordingly, a transaction either succeeds or fails. If it succeeds, the results of the transaction are committed and made permanent. On the other hand, if the transaction fails, all effects of the unsuccessful transaction are undone. Consistency means that a transaction is a correct transformation of state. Finally, durability ensures that once a transaction completes successfully (i.e., Commits) its change to the state of the resource survives failures to the system.

The X/Open distributed processing protocol uses the previously discussed two phase commit procedure as the primary mechanism to enforce ACID properties on transactions. In particular, the Transaction Manager includes recovery procedures that maintain the ACID nature of transactions and re-establish system operation after failure. Furthermore, the Transaction Manager that first receives the application's request to begin a transaction is given primary responsibility for managing the transaction.

Transaction may occur either on a single computer system independently, or on a distributed basis on multiple systems. In a distributed transaction, a transaction may cause changes to be made at one or more sites. In such a system, atomicity can be guaranteed only if all of the sites involved in the transaction agree on its outcome. As described in the above-referenced *Transaction Processing* textbook, distributed transaction systems can use a transaction synchronization procedure called two-phase commit protocol to guarantee the ACID properties of the transaction.

Following is an example to illustrate the two-phase commit protocol. When a transaction ends successfully at a site executing such a two-phase commit protocol, the Transaction Manager requests that all Resource Managers commit or make permanent all data operations involved in the transaction. In the first phase of the protocol, the Resource Managers are requested to prepare to commit. Typically, this is done by calling the xa_end( ) and xa_prepare( ) commands on all the Resources Managers. In response, each Resource Manager individually decides whether, based upon local conditions, it can commit the transaction. Each Resource Manager then "votes", telling the Transaction Manager whether it can commit or it must rollback.

In the second phase, if all votes are to Commit, a request to commit is issued by the Transaction Manager, typically by calling an xa_commit( ) command on the Resource Managers. In response to the Commit command, the Resource Managers commit their respective operation on the resource. If on the other hand, any sites have voted to Rollback, a request to rollback is issued by the Transaction Manager, typically by calling an xa_rollback( ) command. In response to the Rollback command, the Resource Managers rollback their respective operation, returning the resources to their position before the transaction started. Thus, the two-phase commit protocol is used to ensure that the ACID properties of the transaction are maintained in a distributed system.

An X/Open system may use several threads to execute a single transaction. The xa_start( ) and xa_end( ) commands are called on the Resource Manager by the Transaction Manager. The commands pass an identification used to associate or dissociate the calling thread with the transaction branch. The primary function of the xa_start( ) command is to register a new transaction branch with the called Resource Manager. Then a thread is actively associated with a transaction branch if it has called xa_start( ) and has not made a corresponding call to xa_end( ).

Subsequently, the application program, using the same thread of control, uses the Resource Manager's native interface to its work. All requests for service made by the same thread are part of the same branch until the thread dissociates from the branch. Another use of the xa_start( ) command is to join an existing transaction branch that has been suspended.

The xa_end( ) dissociates the calling thread from the transaction branch and lets the branch be completed. Another form of xa_end( ) suspends, instead of ending, a thread's association with the transaction. By using the resume form of xa_start( ), it or another thread can resume its associations with the transaction.

X/Open Registration Techniques In X/Open systems Resource Managers must be registered with Transaction Managers to make them available for processing transaction. Registration serves the purpose of making the Resource Managers known and available to the Transaction Managers such that the resources represented by the Resource Managers can be used in application program transactions. Currently, the X/Open specification defines two methods of registration, static registration and dynamic registration.

In prior art static registration, Resource Managers register with the Transaction Managers before any transactions take place. Control over transactions is then given to the Transaction Manager. When a transaction starts, all the Resource Managers that have associated with the Transaction Manager through static registration are notified. In particular, when the Transaction Manager calls xa_start( ), xa_end( ) and xa_prepare( ), all of the Resource Managers that have been statically registered are called, even those that are not active in the transaction branch. This is inefficient when not every transaction involves every Resource Manager. Naturally, this inefficiency gets worse as more Resource Managers are defined, and can result in significantly degraded performance.

The second registration technique used in X/Open systems is dynamic registration. In some dynamic registration procedures, Resource Managers are not registered to the Transaction Managers ahead of time. By setting a dynamic registration flag these Resource Managers specify to the Transaction Manager to assume that they are NOT involved in a transaction and will instead use dynamic registration. When using dynamic registration, Resource Managers wait until they are called by the application program to do work before dynamically registering with the Transaction Manager. This dynamic registration is done by the Resource Manager calling ax_reg( ) on the Transaction Manager. Thus, by setting the dynamic registration flag the Resource Manager designates that it will use dynamic registration, and that the Resource Manager will register with the Transaction Manager as needed using ax_reg( ). Thus, the Transaction Manager will never call these Resource Managers that use dynamic registration with any form of xa_start( ).

Thus, when an application program requests work on a Resource Manager that uses dynamic registration, the Resource Manager, before doing any work, contacts the Transaction Manager by calling ax_reg( ). The ax___reg( ) call dynamically registers the Resource Manager to the contacted Transaction Manager. The Transaction Manager then returns the appropriate transaction identifier (XID) of the application program in a global transaction. The Resource Manager uses the XID to associate with the works that are performed by this application within this transaction branch. If the thread doing this work ever ends its involvement in the transaction branch (using xa_end( )) then the Resource Manager must again dynamically register using the ax_reg( ) call.

Thus, by using dynamic registration, the Resource Manager only receives and acts on requests that are part of a global transaction that it is involved with. This results in improved messaging efficiency. Unfortunately, there are several disadvantages with the current techniques used for dynamic registration. For example, the Transaction Manager does not have control over the starting of transactions as it does when static registration is used. Instead, the Transaction Manager waits for the Resource Manager to inform the Transaction Manager that it is involved in a new transaction. In a normal case, this can be an efficient way to let the Resource Manager participate in a transaction. However, in some cases a new transaction will be instantiated by the Resource Manager in the process of ending a global transaction and an unpredictable error will occur.

For example, some of the dynamic registration techniques currently used may require a new transaction implicitly at the end of a distributed transaction which may not be aware of the Transaction Manager. This can result in an exception occurring when the Transaction Manager tries to disassociate the application from the Resource Manager. More specially, during the ending of a transaction, the application may want to close the connection. If there is an opened cursor associated with this Connection, then the database will start a new transaction implicitly to close the cursor first before the connection is closed. In this case, the implicit transaction that is started by the Resource Manager during the ending of the global transaction may not been known to the Transaction Manager. Therefore, when the Transaction Manager wants to disassociate or to start a new transaction with the Resource Manager, an exception may occur because the outstanding transaction has not yet completed.

To summarize, neither of these registration methods provide an ideal solution. The static registration method does have the advantage of allowing the Transaction Manager to have control over the initiation of transactions, but has the disadvantages of requiring that registration take place before any work is done, and results in extra unnecessary flows between Transaction Managers and unused Resource Managers. The dynamic registration method has the advantage of limiting Resource Manager involvement to transactions they are involved in, but the disadvantage of the Transaction Manager not having control over Resource Manager involvement. Thus, until now there was no effective way to register Resource Managers with Transaction Managers in an X/Open distributed transaction system.

2. Detailed Description

Figure 1:
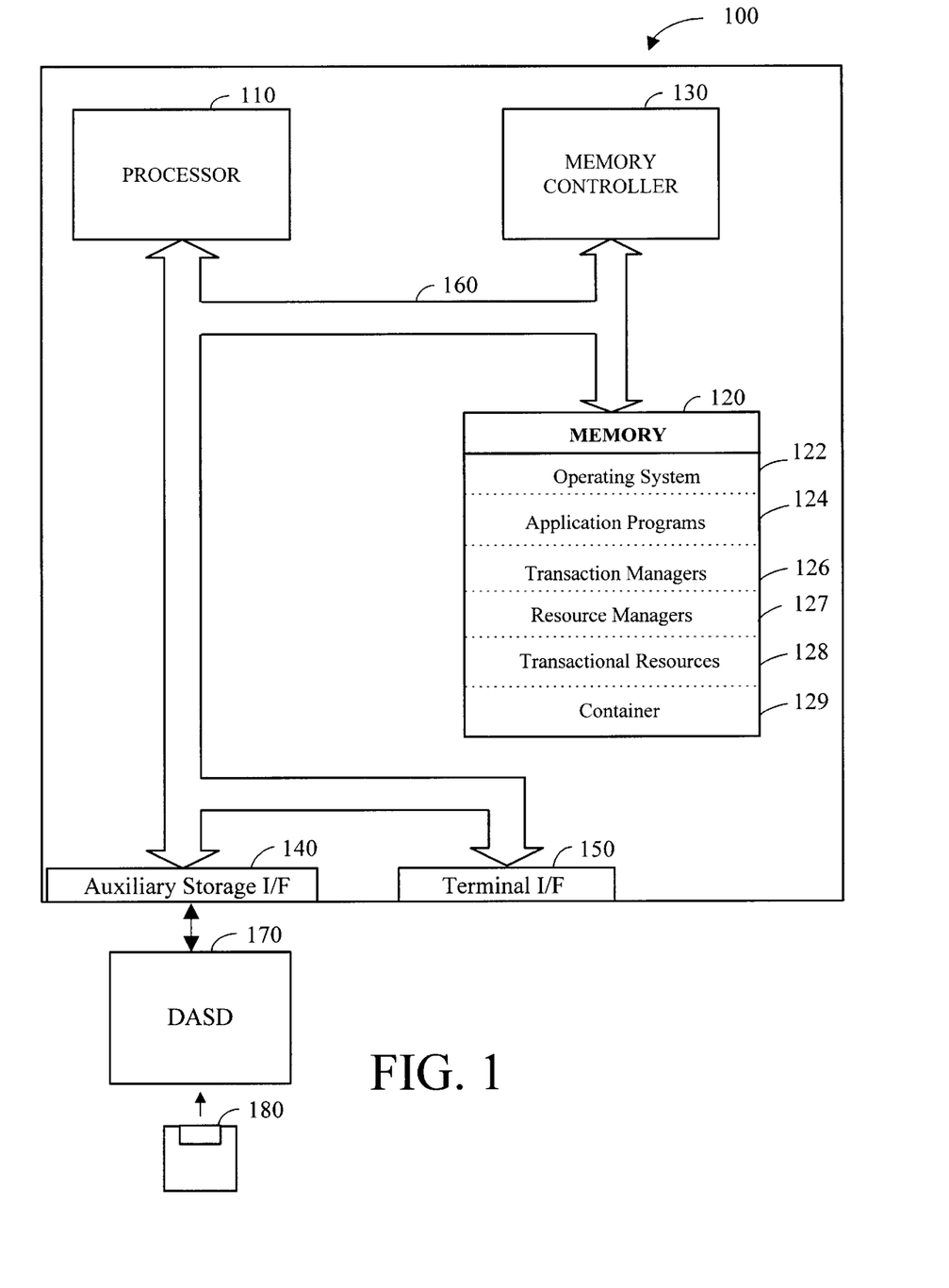
FIG. 1 is a schematic view of a computer system in accordance with a preferred embodiment of the present invention.

Referring now to FIG. 1, a computer system 100 in accordance with a preferred embodiment of the present invention is illustrated. Those skilled in the art will appreciate that the method and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes object-oriented computer programs within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (erg., disk 180) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

In the preferred embodiment, memory 120 suitably includes an operating system 122, application program(s) 124, Transaction Manager(s) 126, Resource Manager(s) one or more transactional resources 128, and container(s) 129. It should be understood that for purposes of this application, in memory 120 is used in its broadest sense, and can include Dynamic Random Access Memory (DRAM), Static RAM (SRAM), flash memory, cache memory, etc. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

The operating system 122 provides the basic functionality that controls the computer system 100. Operating system 122 can comprise any suitable operating system, such as IBM's OS/390, OS/400, OS/2, Microsoft's Windows, Java and the various flavors of UNIX. The application programs 124 can comprise any suitable application program. For example, the application programs can comprise any application in which the two phase commit protocol of X/Open systems are desirable. The Transaction Managers 126 and Resource Managers 127 can be any transaction managers and resource managers as defined and compatible with the X/Open specification. As discussed above, in an X/Open system Transaction Manager 126 assigns global transaction identifiers to transactions, monitors their programs, and takes responsibility for transaction completion and for failure recovery. Likewise, in an X/Open system Resource Managers 127 provide access to shared resources such as databases.

In accordance with the preferred embodiment of the present invention, transactional resources 128 are provided that for each Resource Manager 127 that will be involved in a transaction to represent those Resource Managers 127 to the Transaction Managers 126. The transactional resources 128 of the preferred embodiment implement two main functions. First, the transactional resources 128 provide a mechanism to selectively register Resource Managers 127 to the Transaction Manager 126. Second, the transactional resources 128 implement the commit-control interfaces on behalf of the Resource Managers 127, and thus serve as an intermediary between the Transaction Managers 126.

In the preferred embodiment the transactional resources 128 are created by the container 129 and perform the X/Open registration function, effectively providing a mechanism that indirectly registers the Resource Managers 127 to the Transaction Managers 126. In particular, with each container 129 corresponding to one Resource Manager 127, a transactional resource 128 is preferably in each of the container(s) 129 corresponding to a Resource Manager(s) 127 that will be used involved in the transaction. When new transactions are started, the transactional resource(s) 128 informs the Resource Managers of the new transactions using X/Open static registration techniques. Finally, the container(s) 129 register the transactional resource(s) 128 to the Transaction Manager 126. Thus, the transactional resource(s) 128 serves a registration intermediary that uses static registration techniques to selectively register Resource Managers 127 for each transaction. Furthermore, because the preferred embodiment transactional resource 128 uses static registration techniques, the Transaction Manager 126 maintains control and thus the preferred embodiment does not suffer from the limitations of previous X/Open dynamic registration methods.

The second main function provided by the preferred embodiment transactional resource 128 is to implement the commit-control interfaces on behalf of the Resource Managers 127. Thus, when an application decides to a commit (or rollback) a transaction, the commit (or rollback ) command will call the transactional resource 128 and the transactional resource 128 will call the Resource Managers for this transaction with the appropriate command.

In the preferred embodiment, each transactional resource 128 includes configuration data, such as the system name, a current Resource Manager ID, and a configuration data that includes all the xa_open information, such as the database name and database URL that are used by the open string parameter in the xa_open method.

In the preferred embodiment, the transactional resources 128 are implemented using object oriented technology. Thus, the transactional resource 128 is preferably created by defining a class of objects that implement and facilitate the functionality of the transactional resource 128. Of course, other suitable methods could be used for providing the transactional resource 128.

In the most preferred embodiment the transactional resource 128 is implemented as an object wrapper class over the Resource Manager procedural methods. Thus, the transactional resource 128 preferably includes the interface required of a resource and converts these interfaces to the appropriate xa interfaces needed to interact with the Resource Managers 127. In particular, the transactional resource 128 preferably includes xaClose, xaClose, xaCommit, xaEnd, xaForget, xaPrepare, xaRollback, xaRecover, xaOpen and xaStart methods, that when called by the Transaction Manager 126 call the corresponding X/Open defined xa-function on the Resource Manager 127. Thus, in the preferred embodiment, the transactional resource 128 serves as an intermediary between the Transaction Manager 126 and the Resource Manager 128.

Additionally, the transactional resource 128 preferably includes other desirable methods includes a start Transaction method to call the specified Resource Manager and tell it to start a transaction. This method calls xa_open on the specified Resource Manager if it has not previously invoked on the specified Resource Manager within the thread of control. This method than calls call xa_start on the Resource Manager to start the new transaction. The transactional resource also preferably includes a closeRM that disassociates a Resource Manager from the Transaction Manager within the thread of control.

In the preferred embodiment, the container 129 is an object that provides a persistent store framework for storing and accessing other persistent objects. In particular, the container 129 is preferably the same container used to store configuration information of the corresponding Resource Manager 128. Thus, in the preferred embodiment, a container is provided for each Resource Manager and preferably includes the configuration information for the corresponding Resource Manager, such as database name, user ID, business objects and database tables, etc.

The container 129 preferably includes mechanism to work with factory objects for creating objects in the container 129, and transaction, security and persistence services to provide persistent, transactional access to those objects. Access to objects in the container 129 is preferably through the use of persistent handles that make it possible to provide location transparency to facilitate distributed object interaction.

In the preferred embodiment, the objects stored in container 129 the configuration information for the Resource Manager 127 and all of the business object that involved in transactions that interact with the Resource Manager 127. Additionally, the container 129 asks for the global transaction II) (XID) from the Transaction Manager and creates the transactional resource 128 for this XID. It then registers transactional resource on behalf of the Resource Manager 127 to the Transaction Manager 126.

The container 129 preferably includes configuration information and identity information. This would typically include the container name, container ID and user ID. This configuration information also preferably includes the xa_open string information. Additionally, this configuration information preferably defines the persistent stores, e.g., databases and tables used to store the objects in the container, and that database type and protocols used.

Thus, a typical system will have many containers, with each container corresponding to a resource, and that container 129 containing all of the business objects that are configured to interact with that resource. From the container 129, the system can determine in what persistent stores, e.g., databases, the business objects are persisted in.

Figure 2:
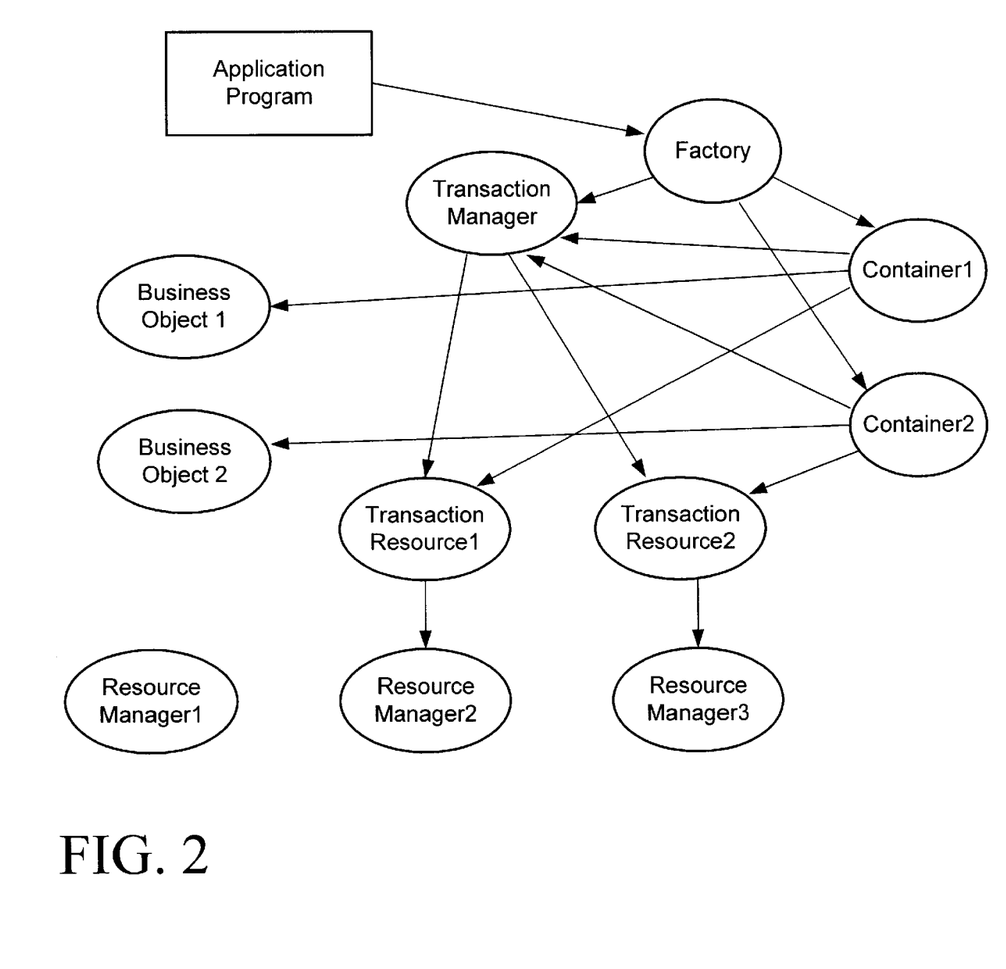
FIG. 2 is a functional block diagram of a portion of a distributed system in accordance with the preferred embodiment.

Turning now to FIG. 2, the preferred embodiment of the present invention is illustrated using an object diagram that illustrates the relevant components in an exemplary system and the interactions between components. When a transaction is started that operates on a business object in the container, the container will create a transactional resource 128 that will represent the resource to the Transaction Manager for this transaction. The container will then register the new transactional resource to the Transaction Manager. The Transaction Manager then uses the static registration technique to inform the Resource Manager to start the new transaction through the transactional resource.

This registration process will need to occur once for each transaction, only on the first execution of a method on the business object which resides in the container for this Resource Manager. Furthermore, because only those transactional resources that represent Resource Managers involved in the transaction are registered with the Transaction Manager, only those Resource Managers participating in the transaction will be involved by the Transaction Manager. Stated another way, the Transaction Manager selectively learns which resources are involved in a current transaction, and thus only has to interact with those resources actually involved in the current transaction.

FIG. 2 illustrates an application program, a factory object, a Transaction Manager object, two container objects, two business objects, two transactional resource objects, and three Resource Manager objects. These are exemplary of the type of objects that could be involved in a transaction. Of course, this example is simplified, as typical large systems would include many more of these types of objects.

Figure 3:
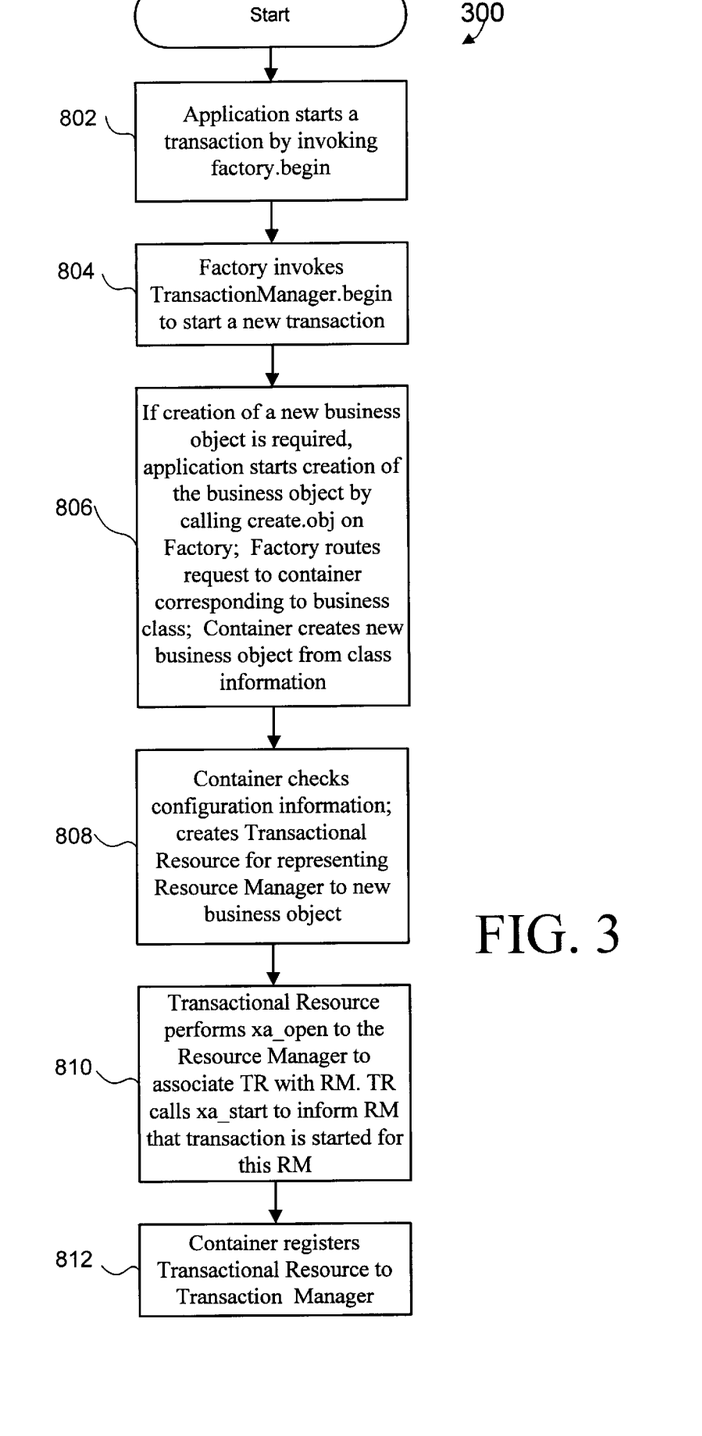
FIG. 3 is a flow diagram of a registration method in accordance with the preferred embodiment.

The interactions between components illustrated in FIG. 2 will now be discussed in greater detail with reference to FIG. 3, with FIG. 3 illustrating a computer implemented method 300 that includes registration in accordance with the preferred embodiment.

Method 300 is exemplary of the process that would occur during each transaction in an X/Open system that uses the preferred registration method. Those skilled in the art will recognize that the steps are merely exemplary of the types of steps that could be performed in such a transaction, and that the actual steps actually performed in any given transaction would depend on the details of that transaction. The first step 802 of method 300 occurs when an application starts a transaction. Typically, this is done by invoking a factory. begin or other suitable method on the factory object. This interaction is illustrated in FIG. 2 by the line extending from the application program to the factory object. The next step 804 is for the factory object to start the new transaction by invoking a TransactionManager.begin method on the Transaction Manager. The Transaction Manager will then assign a global transaction ID that can be used to identify this transaction. This interaction is illustrated in FIG. 2 by the line extending from the factory object to the transaction manager.

In some cases the transaction will involve the creation of new business objects that will be acted upon during the transaction. In other cases, the transaction will only interact with previous created business objects. If the transaction requires the creation of new business objects, the next step 806 is for the application program to start the creation of the new business object by calling the appropriate creation method on the factory object. The factory object then starts the creation of this new business object by routing it to the container corresponding to the business class of the desired object. The container then creates the requested business object in the container. This interaction is illustrated in FIG. 2 by the line extending from the factory object to container 1, and the line extending from container 1 to business object 1.

With any new business objects that are needed for the transaction created, next step 808 is for the container to check the configuration information for the classes of business objects involved in the transaction. As described above, each container preferably includes the configuration data for each class of business objects it holds. From this configuration data, the container can determine what resource each of the classes of business objects needs to be able to interact with. Thus, the container can create a transactional resource that will be used to represent the Resource Manager for this resource for this new transaction, with the new transaction being identified by asking the Transaction Manager for the global transaction ID of this transaction. As discussed above, the container preferably creates this transactional resource by instantiating a new transactional resource object with the appropriate parameters obtained from the configuration data. If a previously created but currently unused transactional resource object already exists in the container, that transactional resource object can instead be reused. In FIG. 2, this creation is illustrated by the line extending from container 1 to transaction resource 1.

With the transactional resource 1 created, the next step 810 is for the transactional resource to perform the X/Open static registration on the appropriate Resource Manager, if necessary. In particular, the transactional resource calls xa_open on the appropriate resource manager. As defined by the X/Open specification, the xa_open call initializes the Resources Manager and associates the Resource Manager with Transaction Manager within the current thread. Of course, the step of calling xa_open will only need to be done once, when the transactional resource is created in this thread. If the transactional resource is reused for the next transaction, it is not necessary to call xa_open again.

The transactional resource than starts the new transaction by calling xa_start on the Resource Manager on behalf of the Transaction Manager. The primary function of the xa_start command is to register a new transaction branch with the called Resource Manager. The xa_start command also actively associates a thread with the new transaction branch until a corresponding xa_end call is made. This completes the static registration flow. In FIG. 2, this interaction is illustrated by the line between transaction resource 1 and resource manager 2.

With the transactional resource associated to the appropriate Resource Manager, the next step 812 is for the container to register the transactional resource to the Transaction Manager. This is done by container calling the RegisterResource method on the Transaction Manager. In FIG. 2, the RegisterResource call is interaction is illustrated by the line extending from container 1 to the Transaction Manager.

The steps 802–812 thus discussed have started a new transaction, created a new business object if necessary, created a transactional resource used to represent the Resource Manager involved in the transaction, used static registration techniques to inform the Resource Manager of the new transaction, and then registered the transactional resource with the Transaction Manager. These steps could then be repeated as necessary for the creation of new business objects and new transactional resources that will also be involved in the transaction. For example, in FIG. 2 the interactions between the factory object and container 2 lead to the creation of a business object 2. Container 2 then creates transactional resource 2 for representing resource manager 3 to the new business object 2. Transactional resource 2 then registers with Resource Manager 3 using static registration, and the container then registers the transactional resource 2 to the Transaction Manager. This process can be repeated as necessary when new business objects are created or whenever new interactions with resources are needed. Thus, the preferred embodiment of the present invention provides a transactional resource and a method for selectively registering the Resource Managers to Transaction Managers that overcomes several of the disadvantages of the prior art. In particular, the preferred embodiment allows for the registration to occur only when the time comes for the Resource Managers to do the work of the transaction. Furthermore, the preferred embodiment allows only Resource Managers that will be involved in a transaction to be registered and thus eliminates unnecessary messaging. Furthermore, the preferred embodiment allows Transaction Manager to maintain control and initiate transactions using the xaStart method on the transactional resources, which then forwards the call using xa_start on the corresponding Resource Manager. Thus, the preferred registration method has the two advantages of maintaining Transaction Manager control while limiting Resource Manager involvement to those transactions that they are specifically involved in.

Figure 4:
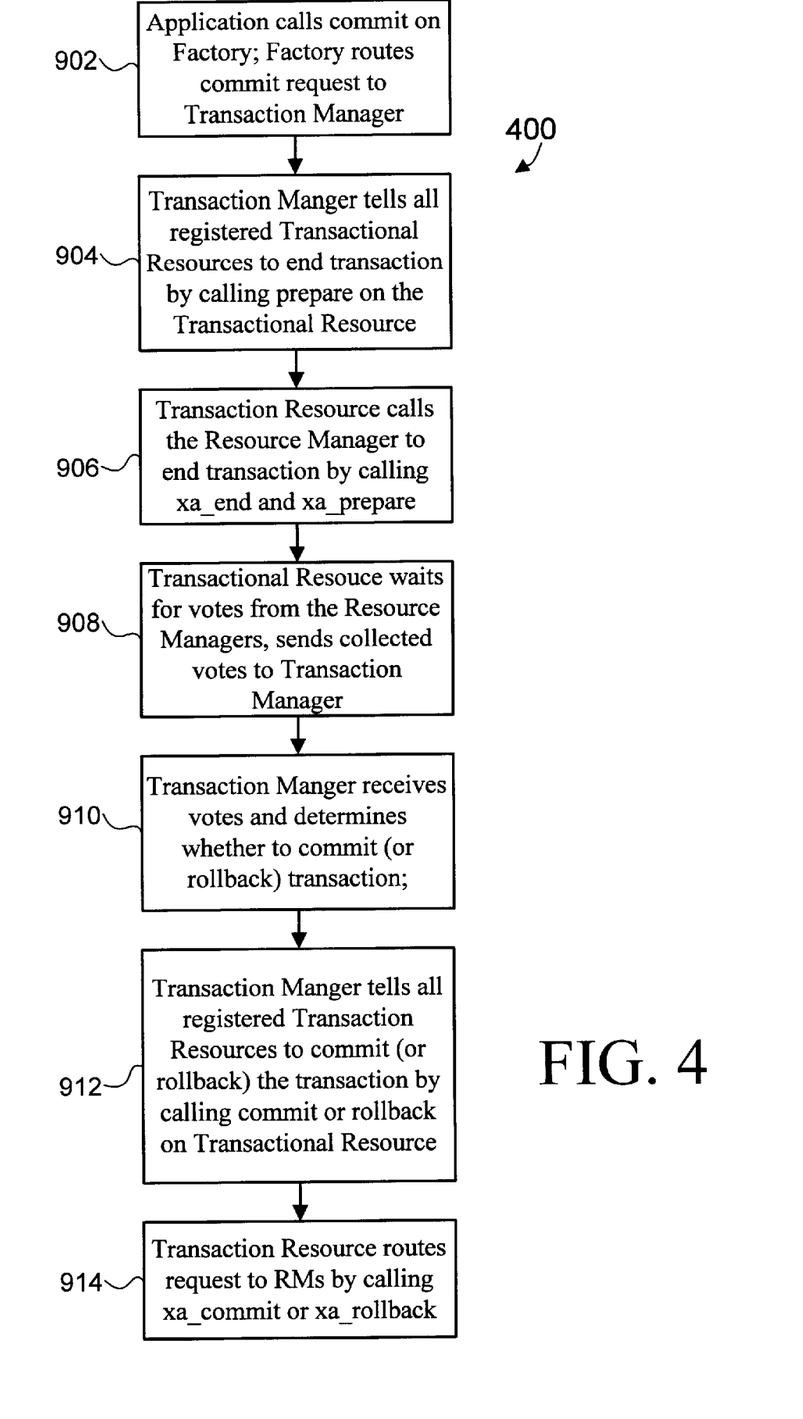
FIG. 4 is a second functional block diagram of a portion of a distributed system in accordance with the preferred embodiment.
Figure 5:
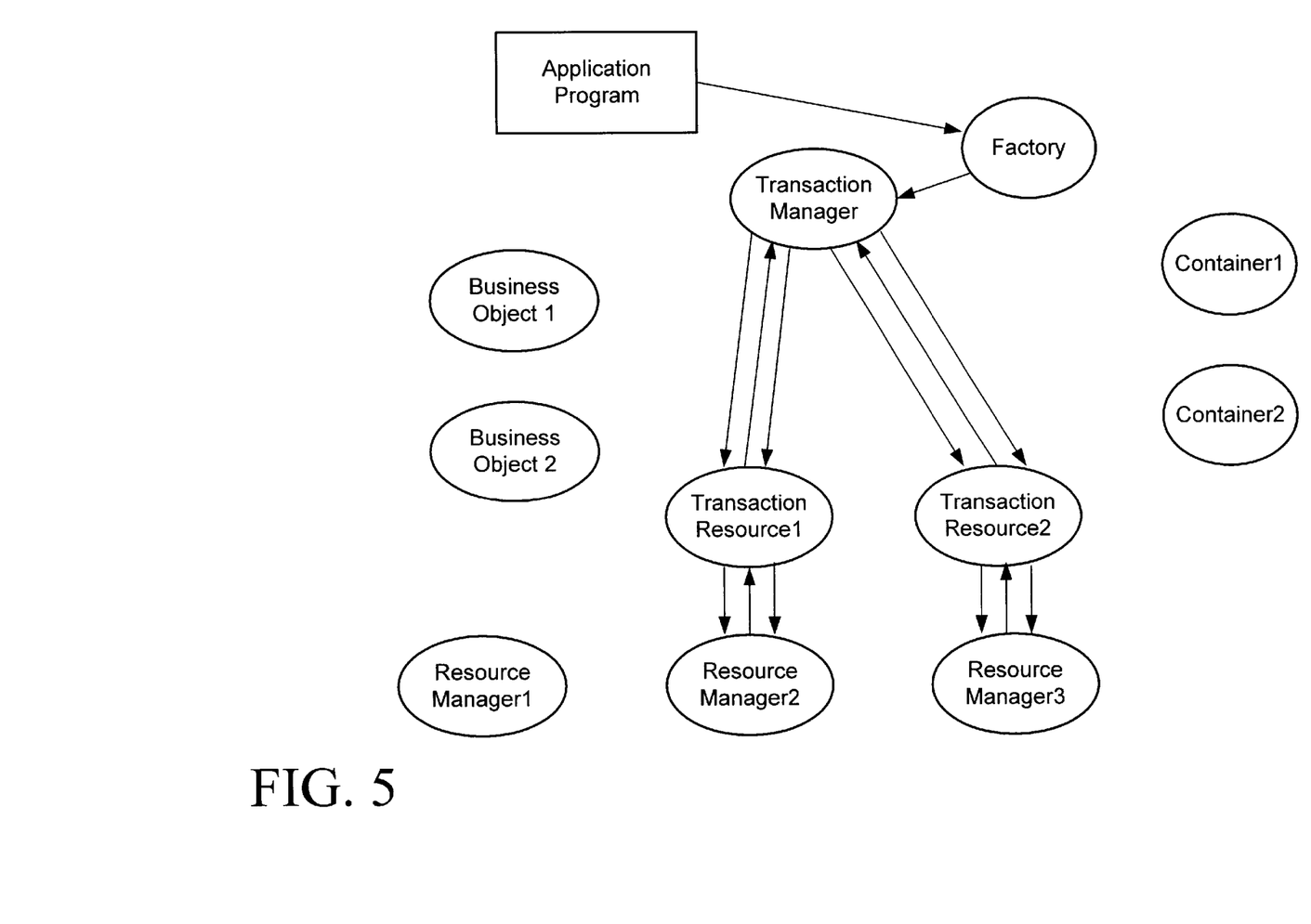
FIG. 5 is a flow diagram illustrating a two phase commit method as implemented in accordance with preferred embodiment.

Turning now to FIGS. 4 and 5, the examples illustrated in FIGS. 2 and 3 will be extended to illustrate the remaining operations in completing an exemplary transaction. FIG. 4 illustrates the method used to commit or rollback transactions in the preferred embodiment system. FIG. 5 illustrates the objects in the exemplary system.

The first step 902 is when the application program orders to commit the current transaction. This is done by calling a commit method on the factory object, which then routes the call to the Transaction Manager. In FIG. 5, these interactions are illustrated by the lines extending from the application program to the factory, and from the factory to the Transaction Manager.

The next step 904 is for the Transaction Manager to tell all registered transactional resources to prepare to end the transaction. This is done by calling the xaPrepare method on the transactional resources as discussed above. In FIG. 5, this interaction is illustrated by the lines extending from the Transactional Manager to transactional resource 1 and transactional resource 2.

The next step 906 is for each transactional resource representing resources involved in the transaction to call the Resource Managers for those resources with xa_end and xa_prepare to end the transaction. In FIG. 5, this interaction is illustrated by the lines extending from transactional resource 1 to Resource Manager 2 and from transactional 2 to Resource Manger 3. This causes the Resource Managers to determine if they can commit the transactions or instead need to rollback the transactions, and send their votes back to the transactional resources. Thus, the next step 908 is for the transactional resources to wait for the votes from the Resource Managers, collect the votes and send the votes to the Transaction Manager upon returning of xaPrepare; In FIG. 5, these interactions are illustrated by the lines extending from Resource Manager 2 to transactional resource 1 and from Resource Manager 3 to transactional resource 2, and the lines that extend from transactional resource 1 and transactional resource 2 back to the Transaction Manager.

The next step 910 is for the Transaction Manager to receive the votes from all transactional resources involved in the transaction and determine whether to commit or rollback the transaction. Typically, the transaction will be committed only if all the resources involved can commit the transaction. Otherwise, the transaction will be rolled back.

Thus, the next step is for the Transaction Manager to call all registered transactional resources to commit or rollback the transaction by calling commit or rollback on the registered transactional resources. In FIG. 5, this interaction is illustrated by the second lines extending from the Transaction Manager to transactional resource 1 and transactional resource 2. The next step 914 is for the transactional resources to route these requests to their corresponding Resource Managers by calling xa_commit or xa_rollback on those Resource Managers. In FIG. 5, this interaction is illustrated by the second lines extending from transactional resource 1 to Resource Manager 2 and from transactional 2 to Resource Manger 3.

Thus, the preferred embodiment provides an improved system and method that uses a container to create and store a transactional resource for representing the Resource Manager to Transaction Manager. The container then registers the transactional resource with the Transaction Manager using X/Open static registration techniques.

By using the transactional resource to selectively register the Resource Managers, only those Resource Managers that are involved in the current transaction will be registered to the Transaction Managers. Furthermore, because the transaction resource uses the X/Open static registration, the Transaction Manager maintains control over the initiation of transactions.

Thus, the preferred embodiment provides that a registration method and mechanism that minimizes unnecessary flows by limiting calls to only those resources that are involved in transactions while allowing the Transaction Manager to retain control of the transaction. Thus, the present invention provides a system and method and that a way to use static registration of resources with Transaction Managers in an efficient way that overcomes the limitations of prior art methods. In particular, the preferred embodiment allows the use of X/Open static registration techniques to facilitate a selective registration that does not suffer from the limitations of previous X/Open dynamic registration methods.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor;
   a computer program residing in the memory and being executed by the at least one processor, the computer program including a plurality of containers, with each container corresponding to a resource manager for a resource in distributed processing system, and wherein each of the plurality of containers creates a transactional resource for representing the corresponding resource manager when the corresponding resource manager is to be involved in a current transaction. and wherein the transactional resource represents the corresponding resource manager involved in the current transaction to a transaction manager.

2. The apparatus of claim 1 wherein the transactional resource informs the corresponding resource manager about the current transaction using static registration techniques.

3. The apparatus of claim 1 wherein the distributed processing system comprises an X/Open system.

4. The apparatus of claim 1 wherein the transactional resource implements a X/Open XA interface for the corresponding resource manager.

5. The apparatus of claim 1 wherein the transactional resource comprises an object wrapper of the corresponding resource manager.

6. The apparatus of claim 1 wherein the transactional resource includes a start method, and wherein the start method calls xa_open if not previously invoked on the resource manager within the thread of control and calls xa_start to start a new transaction, and wherein start method further registers the transactional resource to the transaction manager on behalf of the resource manager.

7. The apparatus of claim 1 wherein the transactional resource includes commit and rollback methods for receiving calls from the transaction manager, and wherein the commit and rollback methods pass the corresponding call to the resource manager.

8. The apparatus of claim 1 wherein the transactional resource includes a prepare method, and wherein the prepare method calls xa_end and xa_prepare on the resource manager when the prepare method is called by the transaction manager.

9. The apparatus of claim 1 wherein the transactional resource collects a vote from the resource manager and passes the collected vote to the transaction manager.

10. The apparatus of claim 1 wherein the container registers the transactional resource to the transaction manager.

11. The apparatus of claim 1 wherein each container includes resource manager configuration information for the corresponding resource manager.

12. An apparatus comprising:
   at least one processor;
   a memory coupled to the at least one processor;
   a computer program residing in the memory and being executed by the at least one processor, the computer program including a plurality of containers, with each container stores configuration information for a corresponding resource manager for a resource in an X/Open system, and wherein each of the plurality of containers creates a transactional resource for representing the corresponding resource manager when the corresponding resource manager is to be involved in a current transaction, and wherein each transactional resource comprises:
      a start method, and wherein the start method calls xa_open if not previously invoked on the resource manager within the thread of control and calls xa_start to start the current transaction, and registers the transactional resource to a transaction manager on behalf of the resource manager.

13. The apparatus of claim 12 wherein the transactional resource additionally includes a prepare method, and wherein the prepare method calls xa_end and xa_prepare on the resource manager when the prepare method is called by the transaction manager, and wherein the transactional resource collects a vote from the corresponding resource manager in response to xa_prepare and passes the vote to the transaction manager.

14. The apparatus of claim 12 wherein each transactional resource additionally includes a commit method and a rollback method, such that when each transactional resource receives a commit call or a rollback call from the transaction manager the transactional resource passes the commit call or rollback call to the corresponding resource manager.

15. The apparatus of claim 12 wherein each the transactional resource comprises an object wrapper of the corresponding resource manager.

16. A program product comprising:
(A) a computer program including a plurality of containers, with each container corresponding to a resource manager for a resource in distributed processing system, and wherein each of the plurality of containers creates a transactional resource for representing the corresponding resource manager when the corresponding resource manager is to be involved in a current transaction. and wherein the transactional resource represents the corresponding resource manager involved in the current transaction to a transaction manager; and
(B) signal bearing media bearing the computer program.

17. The program product of claim 16 wherein the signal bearing media comprises recordable media.

18. The program product of claim 16 wherein the signal bearing media comprises transmission media.

19. The program product of claim 16 wherein the transactional resource informs the corresponding resource manager about the current transaction using static registration techniques.

20. The program product of claim 16 wherein the distributed processing system comprises an X/Open system.

21. The program product of claim 16 wherein the transactional resource implements X/Open XA interface for the corresponding resource manager.

22. The program product of claim 16 wherein the transactional resource comprises an object wrapper of the corresponding resource manager.

23. The program product of claim 16 wherein the transactional resource includes a start method, and wherein the start method calls xa_open if not previously invoked on the resource manager and calls xa_start to start a new transaction, and wherein the start method further registers the transactional resource to the transaction manager on behalf of the resource manager.

24. The program product of claim 16 wherein the transactional resource includes commit and rollback methods for receiving calls from the transaction manager, and wherein the commit and rollback methods pass the corresponding call to the resource manager.

25. The program product of claim 16 wherein the transactional resource includes a prepare method, and wherein the prepare method calls xa_end and xa_prepare on the resource manager when the prepare method is called by the transaction manager.

26. The program product of claim 16 wherein the transactional resource collects a vote from the resource manager and passes the collected vote to the transaction manager.

27. The program product of claim 16 wherein the container includes resource manager configuration information to the transaction manager.

28. The program product of claim 16 wherein the container registers the transaction resource to the transaction manager.

29. A program product comprising:
(A) a the computer program including a plurality of containers, with each container stores configuration information for a corresponding resource manager for a resource in an X/Open system, and wherein each of the plurality of containers creates a transactional resource for representing the corresponding resource manager when the corresponding resource manager is to be involved in a current transaction, and wherein each transactional resource comprises:
a start method, and wherein the start method calls xa_open if not previously invoked on the resource manager within the thread of control and calls xa_start to start the current transaction, and registers the transactional resource to a transaction manager on behalf of the resource manager;
(B) signal bearing media bearing computer program.

30. The program product of claim 29 wherein the signal bearing media comprises recordable media.

31. The program product of claim 29 wherein the signal bearing media comprises transmission media.

32. The program product of claim 29 wherein the transactional resource additionally includes a prepare method, and wherein the prepare method calls xa_end and xa_prepare on the resource manager when the prepare method is called by the transaction manager, and wherein the transactional resource collects a vote from the corresponding resource manager in response to xa_prepare and passes the vote the transaction manager.

33. The program product of claim 29 wherein each transactional resource additionally includes a commit method and a rollback method, such that when each transactional resource receives a commit call or a rollback call from the transaction manager the transactional resource passes the commit call or rollback call to the corresponding resource manager.

34. The program product of claim 29 wherein each the transactional resource comprises an object wrapper of the corresponding resource manager.

35. A method for selectively registering a resource manager to a transaction manager in a distributed transaction system, the method comprising the steps of:
a) creating a transactional resource in a container corresponding to the resource manager, the transactional resource representing the corresponding resource manager to the transaction manager;
b) informing the resource manager of the start of a current transaction using static registration techniques when the resource manager is involved in the current transaction.

36. The method of claim 35 wherein the step of creating a transactional resource comprises retrieving resource manager configuration data from the container and using the configuration data to create the transactional resource.

37. The method of claim 35 wherein the step of creating a transactional resource comprises retrieving a global transaction ID from the Transaction Manager using the global transaction ID to create the transactional resource.

38. The method of claim 35 further comprising step of registering the transactional resource to the transaction manager.

39. The method of claim 35 wherein the distributed transaction system comprises an X/Open system.

40. The method of claim 35 wherein the transactional resource implements a X/Open XA interface for the corresponding resource manager.

41. The method of claim 35 wherein the container comprises a container used to store the corresponding resource manager configuration information.

42. The method of claim 35 wherein the step of informing the resource manager of the start of a current transaction using static registration techniques when the resource manager is involved in the current transaction comprises calling a start method on the transactional resource, and wherein the start method calls xa_open on the resource manager if not previously invoked on the resource manager and calls xa_start on the resource manager to start the current transaction, and wherein the start method further registers the transactional resource to transaction manager.

43. The method of claim 35 wherein the transactional resource includes a prepare method, and wherein the prepare method calls xa_end and xa_prepare on the resource manager when the prepare method is called by the transaction manager.

44. The method of claim 35 further comprising the steps of the transactional resource collecting a vote as to whether to commit the current transaction or rollback the current transaction and passing the collected vote to the transaction manager.

45. A method for selectively registering a plurality of resource managers to a transaction manager in an X/Open system, the method comprising the steps of:
   a) providing a plurality of containers, with each container corresponding to one of the plurality of resource managers and storing resource manager configuration data;
   b) creating a transactional resource in each container corresponding to a resource manager that is to be involved in a current transaction;
   c) associating the transactional resource to the corresponding resource manager within a corresponding thread of control;
   d) associating the resource manager to the new transaction by the transactional resource calling xa_start on the corresponding resource manager when the start method is invoked; and
   e) registering the transactional resource to the transaction manager by calling a registration method on the transaction manager.

46. The method of claim 45 wherein the step of associating the transactional resource to the corresponding resource manager and associating the resource manager to a new transaction calling a start method on the transactional resource, and wherein the start method calls xa_open on the resource manager if not previously invoked on the resource manager and calls xa_start on the resource manager to start the current transaction and register the resource manager to the transaction manager.

47. The method of claim 45 wherein each transactional resource includes a prepare method, and wherein the prepare method calls xa_end and xa_prepare on the resource manager when the prepare method is called by the transaction manager.

48. The method of claim 45 wherein the step of creating a transactional resource comprises retrieving resource manager configuration data from the container and using the configuration data to create the transactional resource in the container, and further comprises retrieving a global transaction ID from the transaction manager and using the global transaction ID to create the transactional resource.

49. The method of claim 45 wherein the transactional resource implements a X/Open XA interface for the corresponding resource manager.

50. The method of claim 45 further comprising the steps of the transactional resource collecting a vote as to whether to commit the current transaction or rollback the current transaction and passing the collected vote to the transaction manager.

* * * * *